(12) United States Patent
Chen

(10) Patent No.: US 7,932,817 B2
(45) Date of Patent: Apr. 26, 2011

(54) WIRELESS WARNING BRAKE LIGHT

(76) Inventor: James L. Chen, Spring Grove, IL (US)

( * ) Notice: Subject to any disclaimer, the term of this patent is extended or adjusted under 35 U.S.C. 154(b) by 264 days.

(21) Appl. No.: 12/258,979

(22) Filed: Oct. 27, 2008

(65) Prior Publication Data

US 2010/0102947 A1 Apr. 29, 2010

(51) Int. Cl.
*B62J 3/00* (2006.01)
*B60Q 1/26* (2006.01)
*B60Q 1/44* (2006.01)

(52) U.S. Cl. ........ 340/432; 340/468; 340/473; 340/479; 340/815.45; 362/800

(58) Field of Classification Search .................... 340/432
See application file for complete search history.

(56) References Cited

U.S. PATENT DOCUMENTS

| | | | | |
|---|---|---|---|---|
| 5,909,173 A | * | 6/1999 | Mason et al. | 340/467 |
| 6,933,836 B2 | | 8/2005 | Hsu | 340/432 |
| 7,218,214 B2 | * | 5/2007 | Werner et al. | 340/468 |
| 7,221,263 B2 | * | 5/2007 | Moore et al. | 340/427 |
| D573,054 S | | 7/2008 | Chen | D10/114 |
| 2005/0134439 A1 | * | 6/2005 | Moore et al. | 340/432 |
| 2006/0012471 A1 | * | 1/2006 | Ross et al. | 340/479 |
| 2007/0247296 A1 | * | 10/2007 | Moore et al. | 340/467 |

* cited by examiner

*Primary Examiner* — Julie Lieu

(57) ABSTRACT

A wireless warning brake light includes a third brake light with a casing installed therein with plural LEDs and a signal receiver for detecting brake signals emitted by an emitter and for activating the LEDs. The rear side of the casing of the third brake light is provided with adhesive material for gluing the third brake light on a safety helmet. A brake light is disposed with plural LEDs and an emitter. The original brake light of a vehicle is replaced with the aforementioned brake light. When the brake light is started, the emitter will be triggered to emit a brake signal that is detected by the receiver of the third brake light, warning vehicles coming from behind. Thus, the safety of motorcyclists or of the drivers of automobiles is ensured.

4 Claims, 7 Drawing Sheets

WIRELESS WARNING BRAKE LIGHT

BACKGROUND OF THE INVENTION

1. Field of the Invention

This invention is described as a wireless warning brake light, specifically one that has an emitter made with the brake light of a vehicle. The original brake light of a vehicle is replaced with the brake light of this invention, and when the brake light is activated, the emitter will simultaneously start to emit a brake signal. The signal is detected by the receiver of the third brake light, which is fixed on a safety helmet or at the rear side of a motorcycle or of an automobile. After receiving the brake signal, the third brake light will display the brake signal, warning vehicles approaching from behind.

2. Description of the Prior Art

A conventional wireless warning brake light, disclosed in U.S. patent application Ser. No. 10/701,508, has the handle or the brake grip of a bike fixed with a reed switch that is combined with a wireless emission module. The brake light of the bike is installed with a wireless receiving module. When a cyclist brakes, the reed switch will operate, causing the wireless emission module to emit a brake signal; this signal is received by the wireless receiving module in the brake light, which subsequently gives out a warning light.

The drawback of the conventional wireless warning brake light is that the signal of the warning light is only derived from the wireless emission module on one side of the reed switch; therefore, the conventional wireless warning brake light cannot be widely applied to different kinds of vehicles or to safety helmets.

The inventor of this case has obtained U.S. D573054 patent for an appearance design of a wireless warning brake light, but this case is related to the structure of the wireless warning brake light.

SUMMARY OF THE INVENTION

The objective of this invention is to offer a wireless warning brake light that is easily installed with an emitter. When the brake light is activated, the emitter will synchronously emit a brake signal, which is detected by a receiver of the third brake light that is fixed on a safety helmet or at the rear side of a motorcycle or of an automobile. After receiving the brake signal, the third brake light will be turned on, warning vehicles approaching from behind.

The features of this invention are a third brake light that has a casing installed with plural LEDs and a receiver that detects brake signals that come from the emitter.

The casing of the third brake light has its rear side provided with adhesive material for gluing the third brake light on a safety helmet, at the rear side of a motorcycle, or at a proper location on the rear side of an automobile.

The wireless warning brake light has the rear brake light of a vehicle installed with an emitter. The original brake light of a vehicle is replaced with the wireless warning brake light. When the warning brake light is activated, the emitter will simultaneously start to emit a brake signal that is detected by the receiver of the third brake light fixed on a safety helmet, or at the rear side of a motorcycle or of an automobile. After receiving the brake signal, the third brake light will give out a warning light.

The wireless warning brake light of this invention can also be disposed with another emitter that can be connected with the rear brake light of a vehicle. Thus, when the brake light is started, the emitter will simultaneously emit a brake signal that is detected by the receiver of the third brake light that is fixed on a motorcyclist's safety helmet, or at the rear side of a motorcycle or of an automobile.

BRIEF DESCRIPTION OF DRAWINGS

This invention is better understood by referring to the accompanying drawings, wherein.

DETAILED DESCRIPTION OF THE PREFERRED EMBODIMENT

Figure 1:
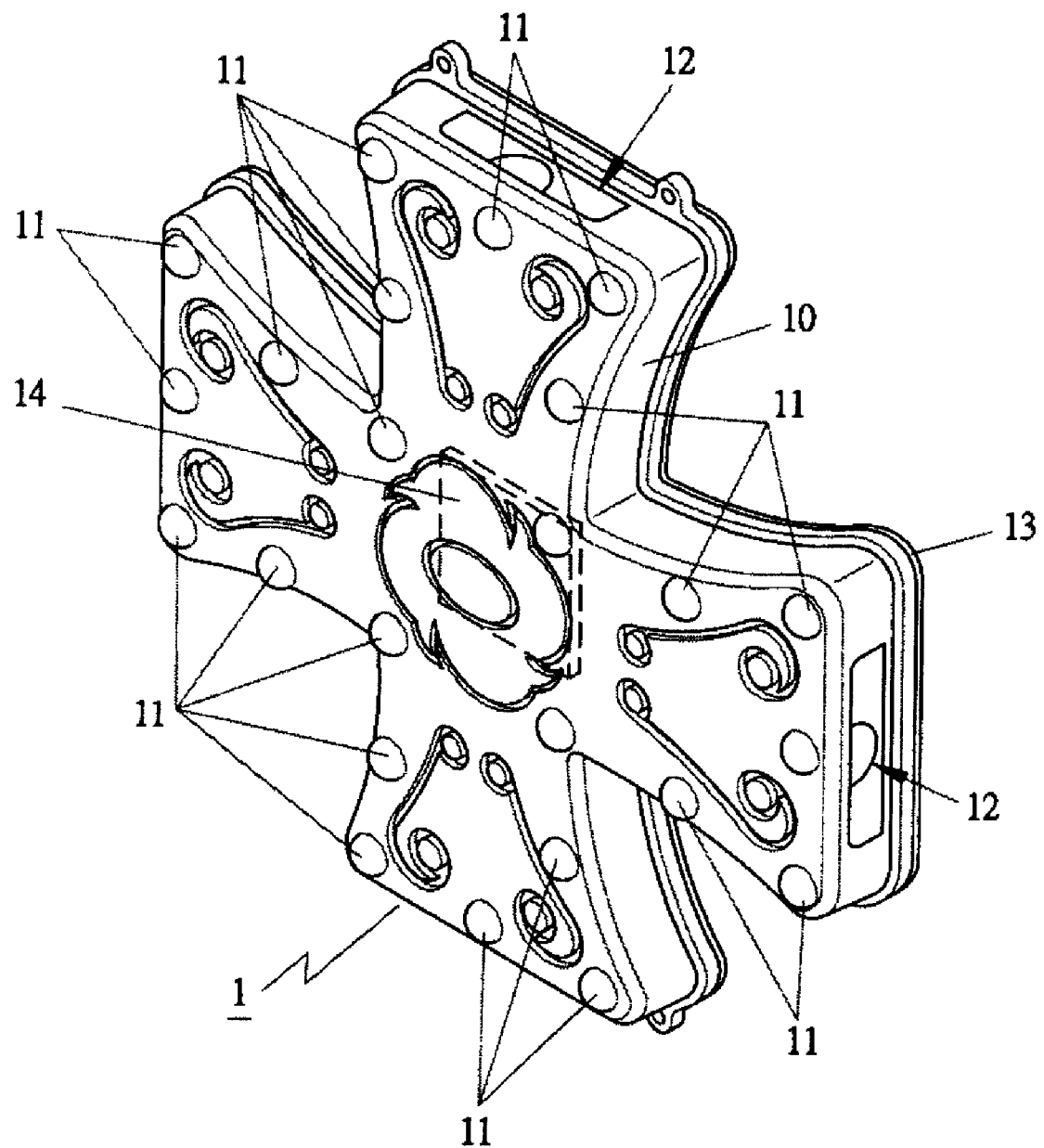
FIG. 1 is a perspective view of a third brake light in the present invention.
Figure 2:
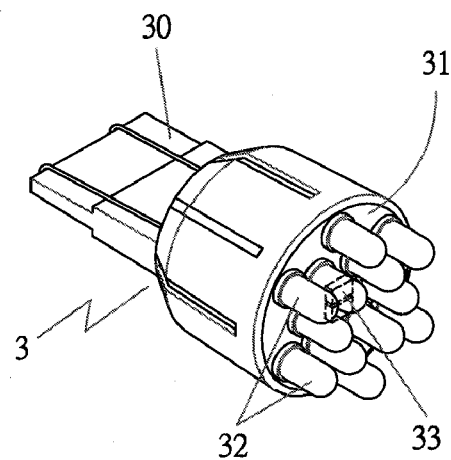
FIG. 2 is a perspective view of a first preferred embodiment of a wireless warning brake light in the present invention.

A preferred embodiment of a wireless warning brake light in the present invention, as shown in FIGS. 1 and 2, includes a third brake light 1 and a brake light 3.

The third brake light 1 is provided with a casing 10 installed with a plurality of LEDs 11 and has one side disposed with a battery groove 12 for receiving batteries to supply both the LEDs 11 of the third brake light 1 and a receiver 14 with a power source. Thus, when the receiver 14 detects a brake signal emitted by an emitter, the LEDs 11 can be started synchronously to give out the brake signal to warn vehicles coming from behind. Further, the casing 10 is provided therein with a receiver 14, which belongs to a conventional technique that is unnecessary to go into detail for.

In addition, the casing 11 of the third brake light 1 has its rear side provided with adhesive material 13, as shown in FIGS. 5, 7, 8 and 9, so that the third brake light 1 can be fixed at the rear side of a safety helmet 20, or at the rear side of a motorcycle 21 or of an automobile 22.

Figure 3:
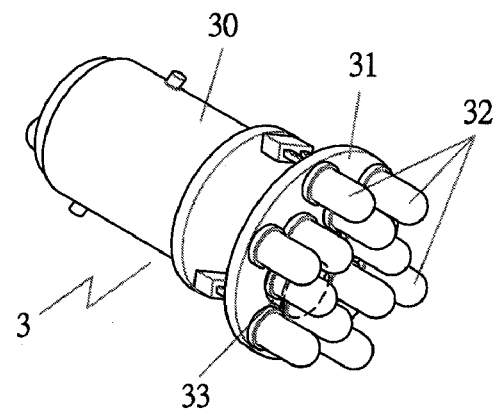
FIG. 3 is a perspective view of a second preferred embodiment of a wireless warning brake light in the present invention.

The brake light 3, as shown in FIGS. 2 and 3, is disposed with a plurality of LEDs 32 and a lamp socket 30. The lamp socket 30 of the brake light 3 can be made differently in shape or in structure for matching with different shapes or structure of the lamp socket grooves of the rear brake light of a vehicle. For instance, the lamp socket 30 can be rectangular-shaped, as shown in FIG. 2, or circular-shaped, as shown in FIG. 3, but actually the shapes of the lamp socket 30 are not limited to the two shapes mentioned above.

Figure 6:
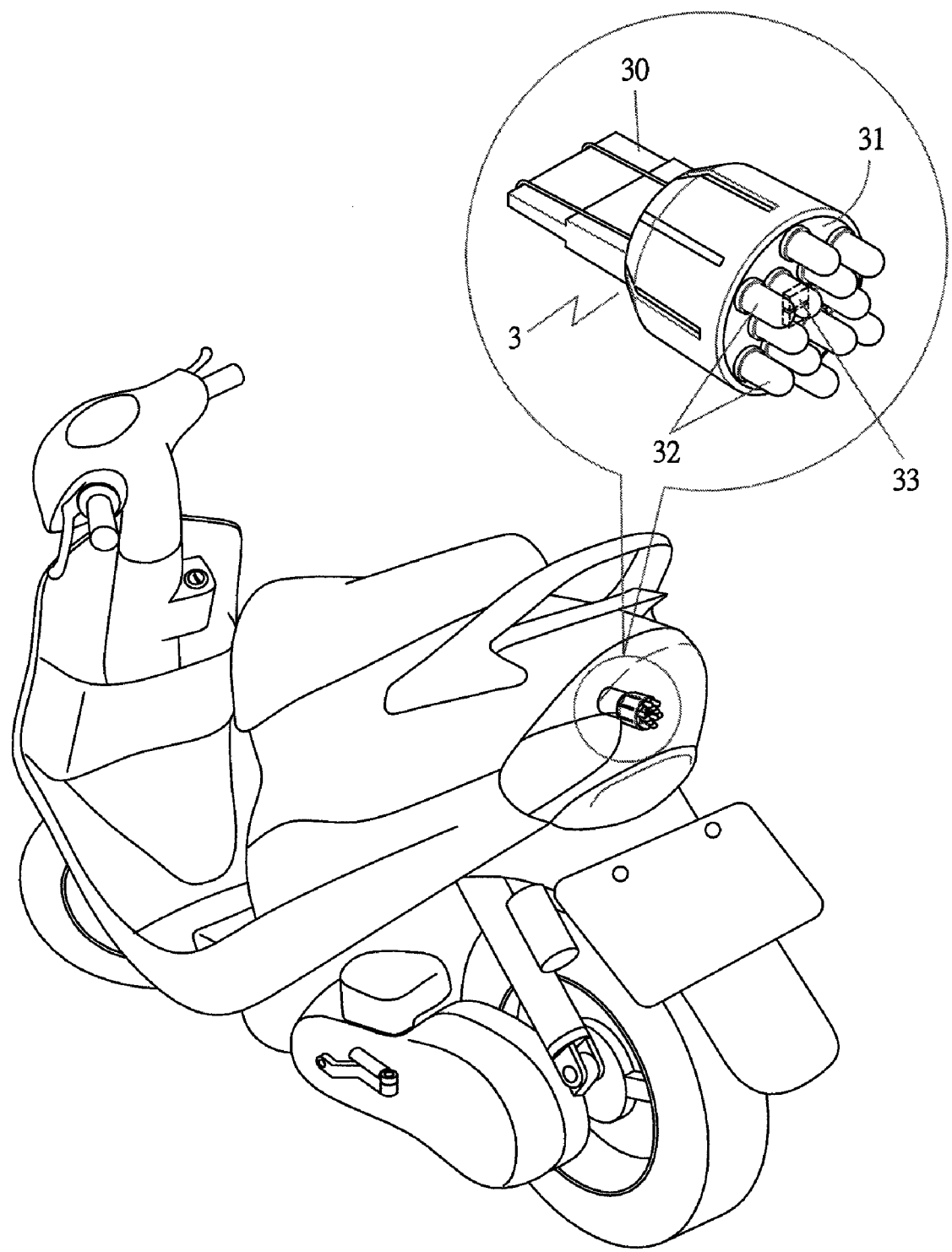
FIG. 6 is a perspective view of a motorcycle having its original brake light replaced with the wireless warning brake light in the present invention.
Figure 7:
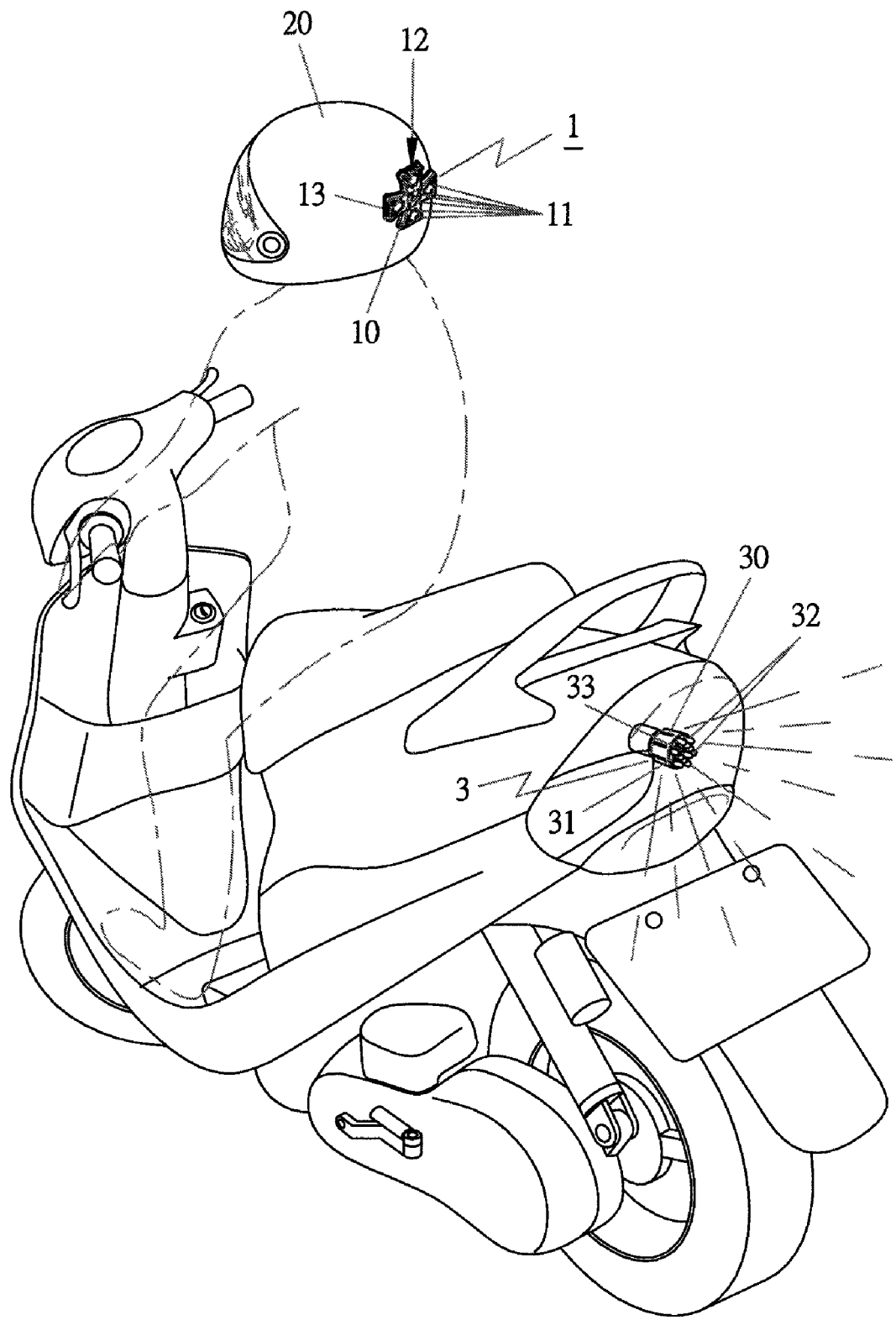
FIG. 7 is a perspective view of the third brake light fixed on a safety helmet in the present invention.
Figure 8:
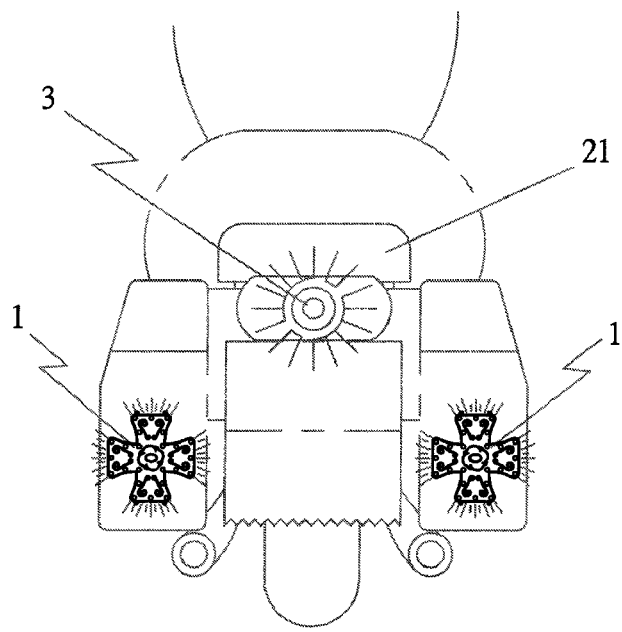
FIG. 8 is a front view of the third brake light fixed at the rear side of a motorcycle in the present invention.
Figure 9:
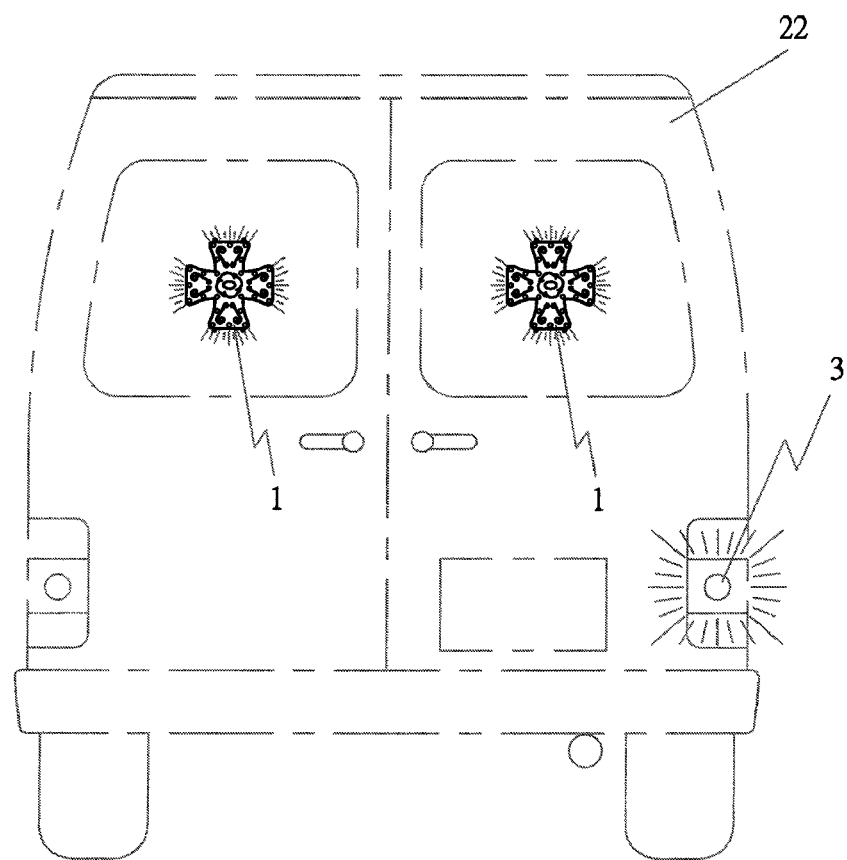
FIG. 9 is a front view of the third brake light fixed at the rear side of an automobile in the present invention.
Figure 10:
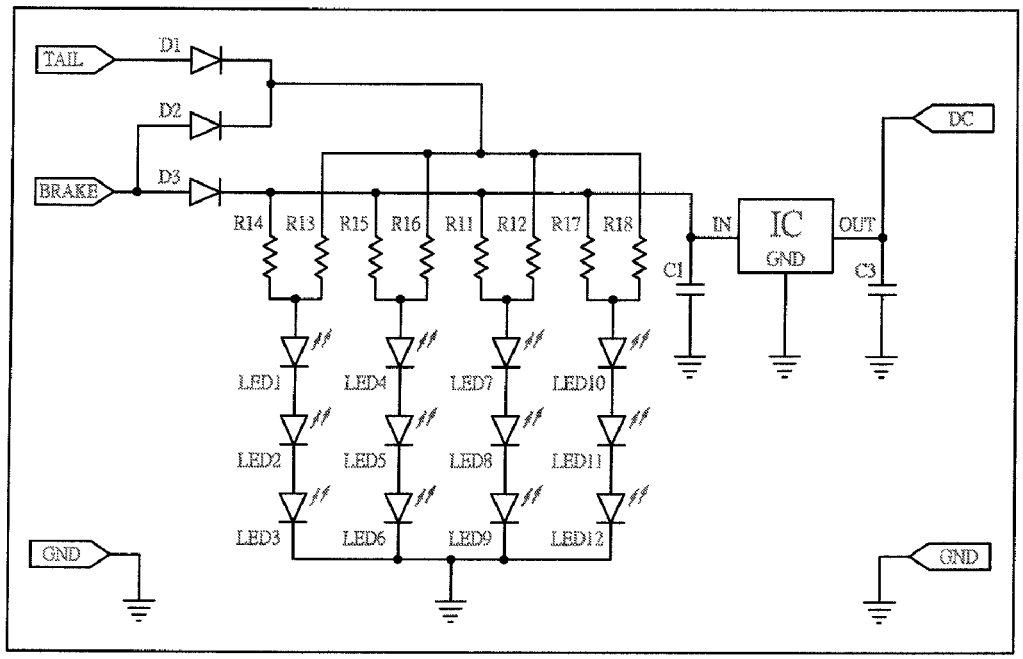
FIGS. 10(A) and 10(B) are diagrams of control circuits of the rear brake light in the present invention.
Figure 10:
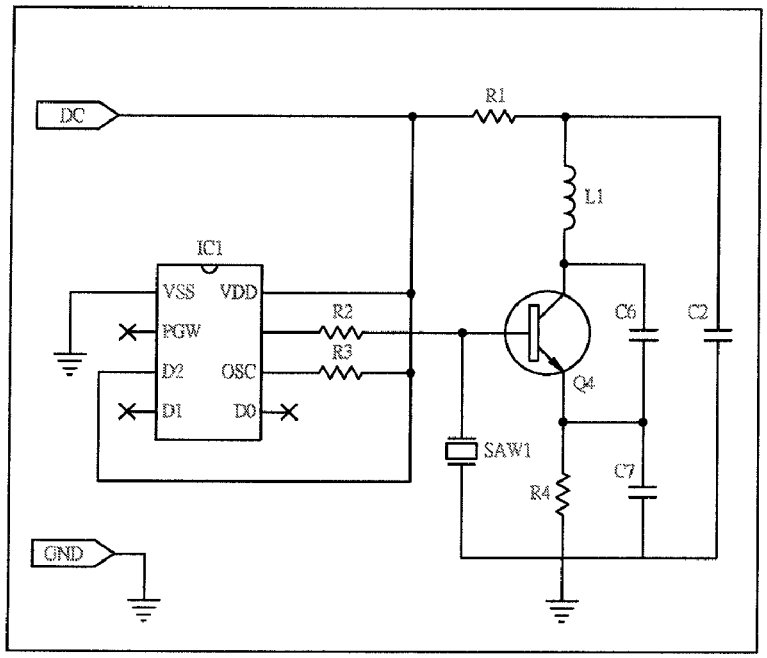

Referring to FIGS. 2 and 3, the lamp socket 30 has one side provided with a circuit board 31 disposed therein with plural LEDs 32, which can be different in number according to practical need and is not limited to the number shown in FIG. 2 or in FIG. 3. Furthermore, the circuit board 31 is installed with an emitter 33 whose control circuit is shown in FIG. 10B, while the control circuit of the LEDs is shown in FIG. 10A. Since the emitter 33 and the LEDs 32 are made together, as shown in FIGS. 2, 3 and 6, a user can replace the original brake light of the vehicle with the brake light 3. Thus, when the brake light 3 is started, the emitter 33 will synchronously start to emit a brake signal detected by the receiver in the third brake light 1 that is fixed on a safety helmet 20, as shown in FIG. 7, or at the rear side of a motorcycle 21, as shown in FIG. 8, or at the rear side of an automobile 22, as shown in FIG. 9. As soon as the receiver 14 detects the brake signal, the third brake light 1 will be started to give out the brake signal to warn the vehicle coming behind, enabling drivers of various kinds of vehicles to drive with great safety.

Figure 4:
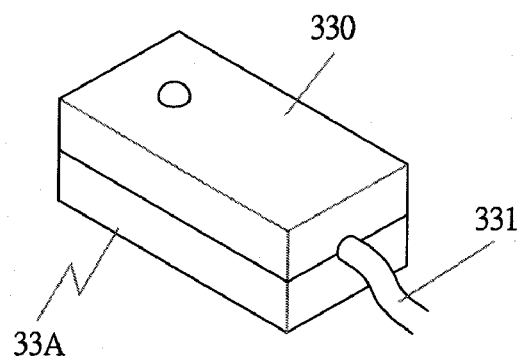
FIG. 4 is a perspective view of an emitter to be connected with a common brake light of a vehicle in the present invention.
Figure 5:
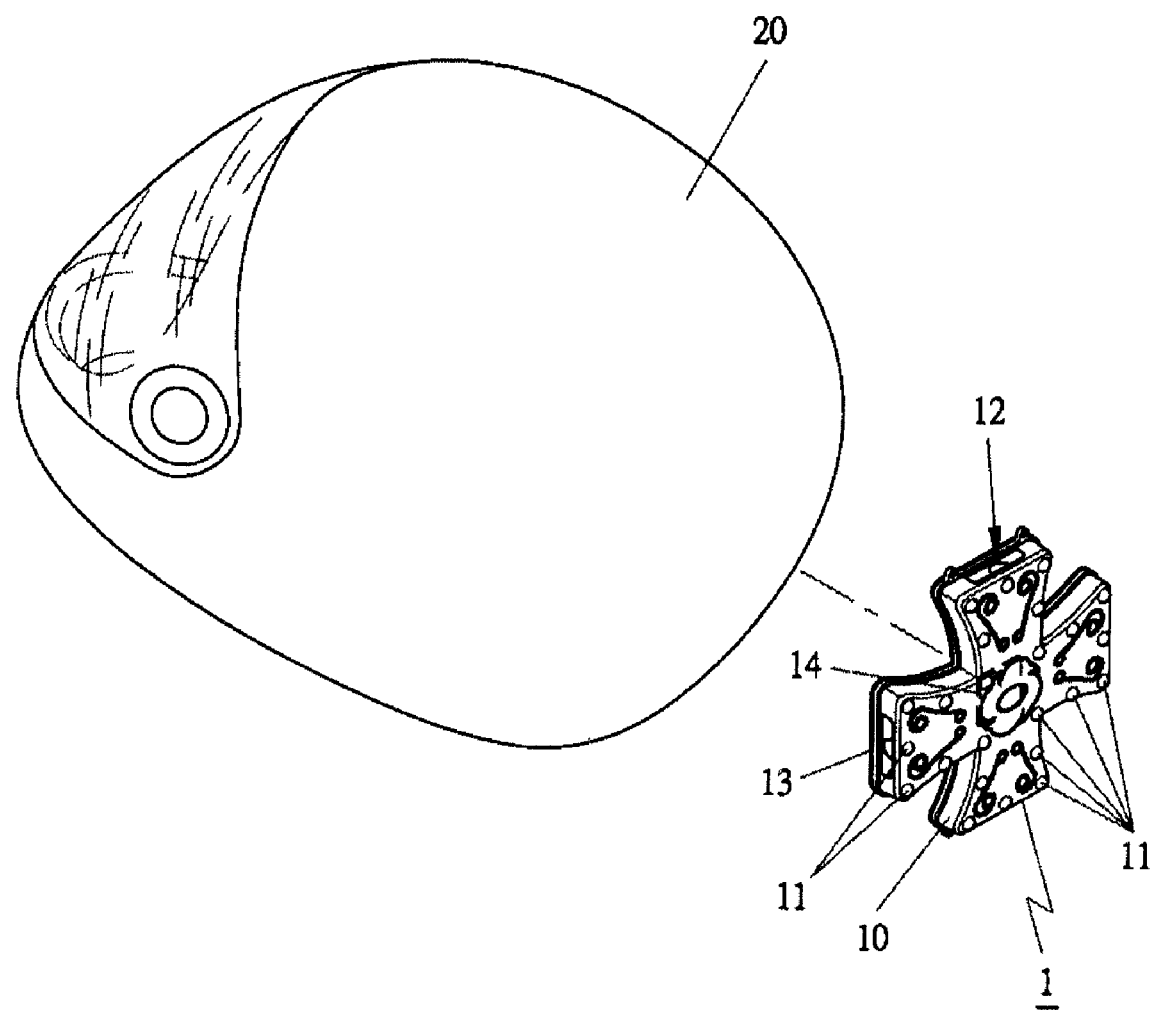
FIG. 5 is perspective view of a third brake light and a safety helmet before being combined together in the present invention.

FIG. 4 shows another kind of emitter 33A provided with a casing 330 and a guide wire 331 to be connected with a power source of common brake lights of a vehicle. Thus, when the brake light is started, the emitter 33A will synchronously start to emit a brake signal detected by the receiver 14 of the third brake light 1 to let the third brake light 1 start to give out the brake signal to warn the vehicles coming from behind, ensuring the safety of drivers of various kinds of vehicles.

To summarize, the wireless warning brake light of this invention is formed with a structure convenient for installing an emitter that is combined with the rear brake light of a vehicle. For assembly, a user only needs to disassemble and replace the original rear brake light of the vehicle with the rear brake light of this invention.

While the preferred embodiments of the invention have been described above, it will be recognized and understood that various modifications may be made therein and the appended claims are intended to cover all such modifications that may fall within the spirit and scope of the invention.

What is claimed is:

1. A wireless warning brake light comprising:
    a third brake light provided with a casing, said casing installed with plural LEDs, said casing disposed therein with a receiver; and
    a brake light provided with a lamp socket having one side assembled with a circuit board, said circuit board installed therein with plural LEDs and an emitter, wherein an original brake light of a vehicle is replaced with said brake light, said brake light is started to trigger said emitter to emit a brake signal, said brake signal is received by said receiver of said third brake light to let said third brake light start synchronously.

2. The wireless warning brake light as claimed in claim 1, wherein said casing of said third brake light has its rear side provided with adhesive material for gluing said third brake light on a safety helmet.

3. The wireless warning brake light as claimed in claim 1, wherein said lamp socket of said brake light can be made differently for tallying with different socket grooves of a rear brake light of the vehicle.

4. The wireless warning brake light as claimed in claim 1, wherein another emitter is additionally provided, comprising a casing and a guide wire to be connected with a power source of the original brake light of the vehicle, said another emitter is triggered to emit a brake signal when said brake light is started, and said receiver of said third brake light receives said brake signal to start said third brake light.

* * * * *